United States Patent
O'Brien et al.

(10) Patent No.: US 7,337,373 B2
(45) Date of Patent: Feb. 26, 2008

(54) DETERMINING THE SOURCE OF FAILURE IN A PERIPHERAL BUS

(75) Inventors: Michael O'Brien, Seattle, WA (US); Peter Gravestock, New Farm (AU)

(73) Assignee: GoAhead Software, Inc., Bellevue, WA (US)

( * ) Notice: Subject to any disclaimer, the term of this patent is extended or adjusted under 35 U.S.C. 154(b) by 0 days.

(21) Appl. No.: 11/489,032

(22) Filed: Jul. 18, 2006

(65) Prior Publication Data

US 2007/0038899 A1 Feb. 15, 2007

Related U.S. Application Data

(63) Continuation of application No. 10/250,345, filed on Mar. 8, 2004, now abandoned.

(51) Int. Cl.
G06F 11/00 (2006.01)
(52) U.S. Cl. .......................... 714/56; 714/55
(58) Field of Classification Search ............. None
See application file for complete search history.

(56) References Cited

U.S. PATENT DOCUMENTS

| | | | | |
|---|---|---|---|---|
| 5,129,080 A | * | 7/1992 | Smith | 714/4 |
| 5,390,326 A | * | 2/1995 | Shah | 370/222 |
| 5,715,496 A | * | 2/1998 | Sawada et al. | 399/8 |
| 5,768,501 A | * | 6/1998 | Lewis | 714/48 |
| 5,822,512 A | * | 10/1998 | Goodrum et al. | 714/13 |
| 5,872,931 A | * | 2/1999 | Chivaluri | 709/223 |
| 5,944,782 A | * | 8/1999 | Noble et al. | 709/202 |
| 6,112,311 A | * | 8/2000 | Beardsley et al. | 714/3 |
| 6,182,249 B1 | * | 1/2001 | Wookey et al. | 714/47 |
| 6,327,677 B1 | * | 12/2001 | Garg et al. | 714/37 |
| 6,370,656 B1 | * | 4/2002 | Olarig et al. | 714/23 |
| 6,532,552 B1 | * | 3/2003 | Benignus et al. | 714/25 |
| 6,553,416 B1 | * | 4/2003 | Chari et al. | 709/224 |
| 6,757,850 B1 | * | 6/2004 | Lehner | 714/48 |
| 7,020,076 B1 | * | 3/2006 | Alkalai et al. | 370/217 |
| 2002/0087687 A1 | * | 7/2002 | Zaifman et al. | 709/225 |
| 2002/0097672 A1 | * | 7/2002 | Barbas et al. | 370/216 |
| 2002/0152432 A1 | * | 10/2002 | Fleming | 714/47 |
| 2003/0061340 A1 | * | 3/2003 | Sun et al. | 709/224 |
| 2004/0139373 A1 | * | 7/2004 | Brown | 714/47 |
| 2006/0168191 A1 | * | 7/2006 | Ives | 709/224 |

OTHER PUBLICATIONS

Stevens, "Protocol", TCP/IP Illustrated, vol. 1: The Protocols, Addison-Wesley, 1994, pp. 360-362.*
"Failure Detection in a Symmetric System", Jan. 1, 1995, IBM Technical disclosure bulletin, vol. 38, iss 1.*

* cited by examiner

Primary Examiner—Gabriel Chu
(74) Attorney, Agent, or Firm—James L Davison

(57) ABSTRACT

Many computing system environments require continuous availability and high operational readiness. The ability to find, diagnose, and correct actual faults and potential faults in these systems is a high priority. By combining a continually updated database of computing system performance with the ability to analyze that information to detect faults and then communicating that fault information to correct the fault or provide appropriate notification of the fault results in achieving the goals of high availability and operational readiness. FIG. (1) shows how the data collectors, fault detectors and policy actions are combined to meet those goals.

4 Claims, 3 Drawing Sheets

DETERMINING THE SOURCE OF FAILURE IN A PERIPHERAL BUS

CROSS-REFERENCE TO RELATED APPLICATIONS

This application is a continuation of application Ser. No. 10/250,345 now abandoned, Filed 8 Mar. 2004 from PCT Application US01/49945 Filed 28 Dec. 2001, entitled to the priority date of Provisional Application 60/258,701 filed 29 Dec. 2000.

BACKGROUND

1. Field

The present invention applies to the field of fault diagnostics in computing systems using detectors and policies.

2. Description of Related Art

Comprehensive fault management plays an important role in keeping critical computing systems in a continuous highly available mode of operation. These systems must incur minimum downtime, typically in the range of seconds or minutes per year. In order to meet this goal every critical component (a critical component is one that, upon failing, fails the entire corresponding system) must be closely monitored for both occurring faults and potentially occurring faults. In addition it is important that these faults be handled in real time and within the system rather than remotely as is done in many monitoring systems today. An example of a remote monitoring system is a system that follows the Simple Network Management Protocol (SNMP). For the foregoing reasons there is a need for a fast, small footprint, real time system to detect and diagnose problems. In addition it's preferred that this system also be cross-platform, extensible and modular.

SUMMARY

The present invention uses a method for detecting faults in a computing environment and then taking action on those faults. If the fault detected meets predetermined criteria then the detection module sends an event signal to a policy module that in turn takes a programmed action depending on predetermined criteria that analyzes the variables associated with the event signal. The resulting action may range from sending email to causing a device switchover from a defective device to a correctly operating device. The detection modules are also capable of sending event signals to other detection modules. These other detection modules may only react if multiple signal are received from the primary detection modules. This aids in the diagnosis of the system fault. Data is continually collected from the computing system and this data is kept in a readily accessible database that may be read by the detection modules. The computing system data is continually updated so the information is current and fresh. The detection modules continually scan the data appropriate for the particular detection module interested in that information.

DETAILED DESCRIPTION OF THE INVENTION

Figure 1:
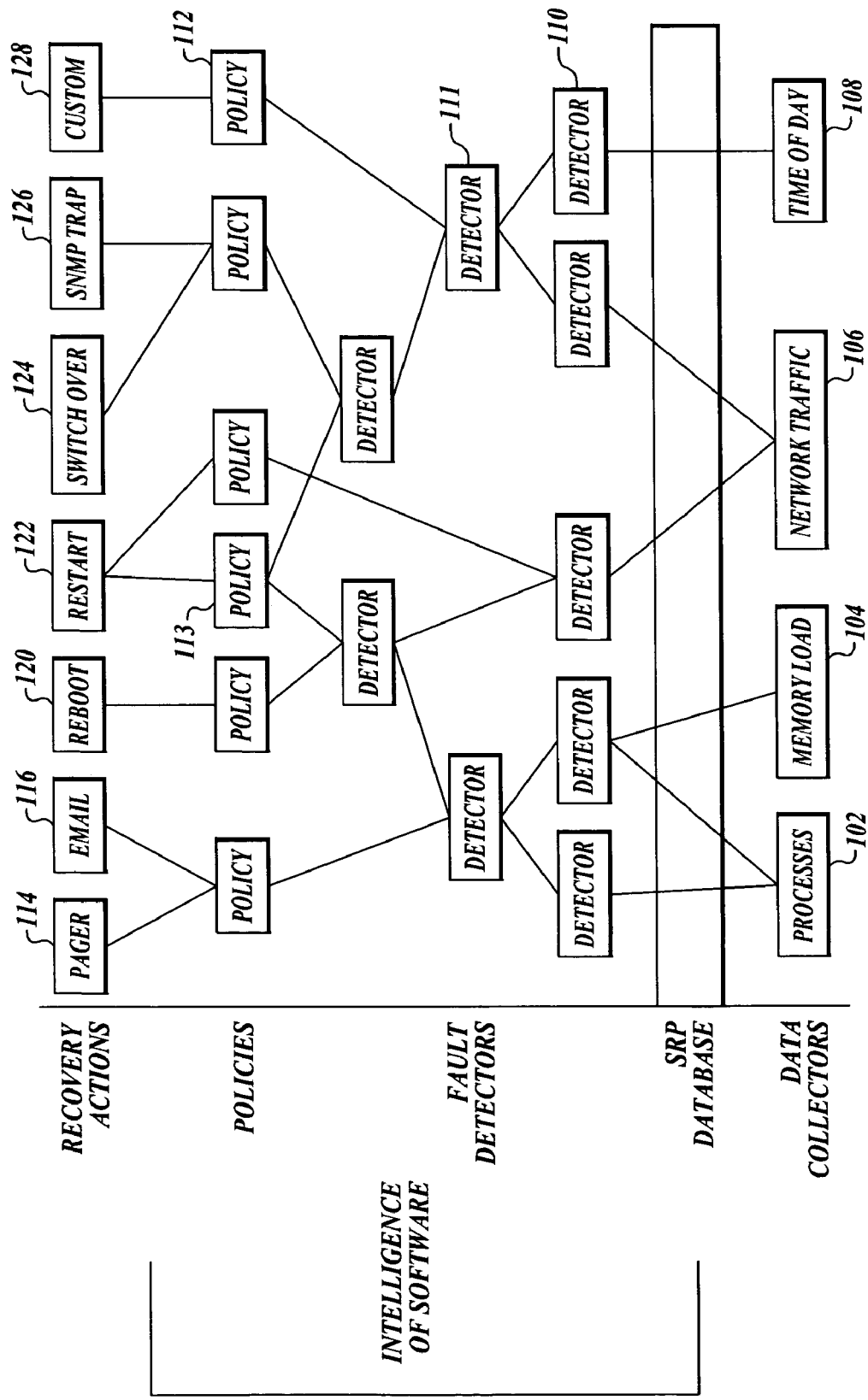
FIG. 1 shows an overview of the fault detection system.

The preferred embodiment and best mode of this invention provides a framework for diagnosing faults in a computing system environment. It includes the capabilities of detecting, and diagnosing computing systems problems and individual device problems within that system.

The detection capability identifies an undesirable condition that may lead to the loss of service from the system or device. Detection also includes the discovery of a fault using error detection or inference. The detection may occur through direct observation, by correlating multiple events in time, or by inference, that is, by observing other types of behavior of the system. Some sets of circumstances may lead to the conclusion that an event is a fault whereas another set of circumstances may lead to a different conclusion (e.g. the event is normal system behavior).

Diagnosis occurs when one or more events and system parameters are used to determine the nature and location of a fault. This step can be performed by the fault detection system or invoked separately as a user diagnostic. The diagnosis may be acted upon automatically by the system or may be reported to the user for some user action to be taken. In some systems it's possible that a single fault may lead to multiple errors being detected. By doing a root cause analysis the fault may be able to be isolated and acted upon. Isolation actions contain the error or problem and keep it from spreading throughout the system. Isolation actions and recovery actions are often done in conjunction with each other. An example of an isolation action is one in which a memory usage size is imposed upon an application when the fault management system recognizes that the application is continually absorbing memory without a follow-on release of said used memory when no longer needed by the application. Another isolation example is where the power to a board is terminated when the board is recognized as having a failed component. Recovery occurs when a fault management system takes action to restore a system to service once a fault has occurred. The recovery actions cover a wide range of activities, from restarting a failed application to failing over to a standby hardware card. The recovery process is often takes multiple steps wherein those steps comprise several actions that must be taken in specific order. In some cases, the recovery process is multitiered in that, if a specific action doesn't recover the system then some other action must be taken.

Notifying or logging to either the system or to the user of the diagnosis made and the resultant action taken is known as reporting. For example if an application crashes it might be both recovered, for example by restarting, and reported via email or paging.

Repair is defined as the replacement of the hardware or software components as necessary. Hardware components may be hot swapped (taken out and replaced while the system, still running, switches over to another component), for example network interface cards, or, instead of hot swapping the system may be shut down and the failed part manually replaced and repaired.

Detectors and policies can be arranged in networks of arbitrary complexity to capture the dependencies between events, faults, and errors. The actions taken may be arbitrarily complex functions or even calls to other programs.

In the current embodiment the detectors and policies are encoded in multiple XML-based files, which help achieve the cross-platform, extensible, and modular design goals. Table 1 shows a typical database table for a detector. The columns of the table specify the attributes of the detector component. Because detectors and policies are implemented in XML and embedded JavaScript changes to policies and reconfiguration of detectors can be done easily and without recompilation. This run-time modification of behavior supports faster development. Detectors and policies can be developed independently and plugged into the fault management system.

TABLE 1

Detector

| Column Name | Description |
| --- | --- |
| name | Name that identifies the detector. Must be globally unique among all detectors defined for all SelfReliant extensions. Used primarily when running one detector from another, or when specifying detector sets in schedules. |
| description | Description of what the detector detects. |
| type | The type of detector. The type specified here can be used by other detectors as well. Policies are triggered by detectors based on their type, so this field is the link between a detector and its policy. |
| url | URL to a Web page served by the SelfReliant WebServer ™ that provides an HTML-based explanation of the detector's output. |
| events | Space-delimited list of events that the detector listens to. Multiple detectors can listen to the same event. |
| types | Space delimited list of the types of detectors that cause this detector to fire. The detector rule will run if a detector of a type listed here fires with a non-zero output. |
| enable | Boolean value that indicates whether the rule for this detector should run. If 0, the detector rule will not be run no matter how the detector is invoked. |
| rule | Embedded JavaScript rule that is run when the detector is invoked. The rule has access to all global variables and functions defined for use within the detector namespace. |

Detectors "listen" for specified events and can be also be made aware if other detectors have triggered. This approach is the opposite of function calling because it allows new detectors to be added to listen for new events without requiring an edit of the set of functions. This capability, along with run-time interpreting of detectors and policies provide support for modularity and reusability.

The procedural part of detectors and policies is coded in "embedded JavaScript" which is a very small footprint subset of the JavaScript language. Any function written in the C language can be nominated into and called from the JavaScript namespace. This embodiment of the invention makes extensive use of an in-memory database to store data and code.

Figure 2:
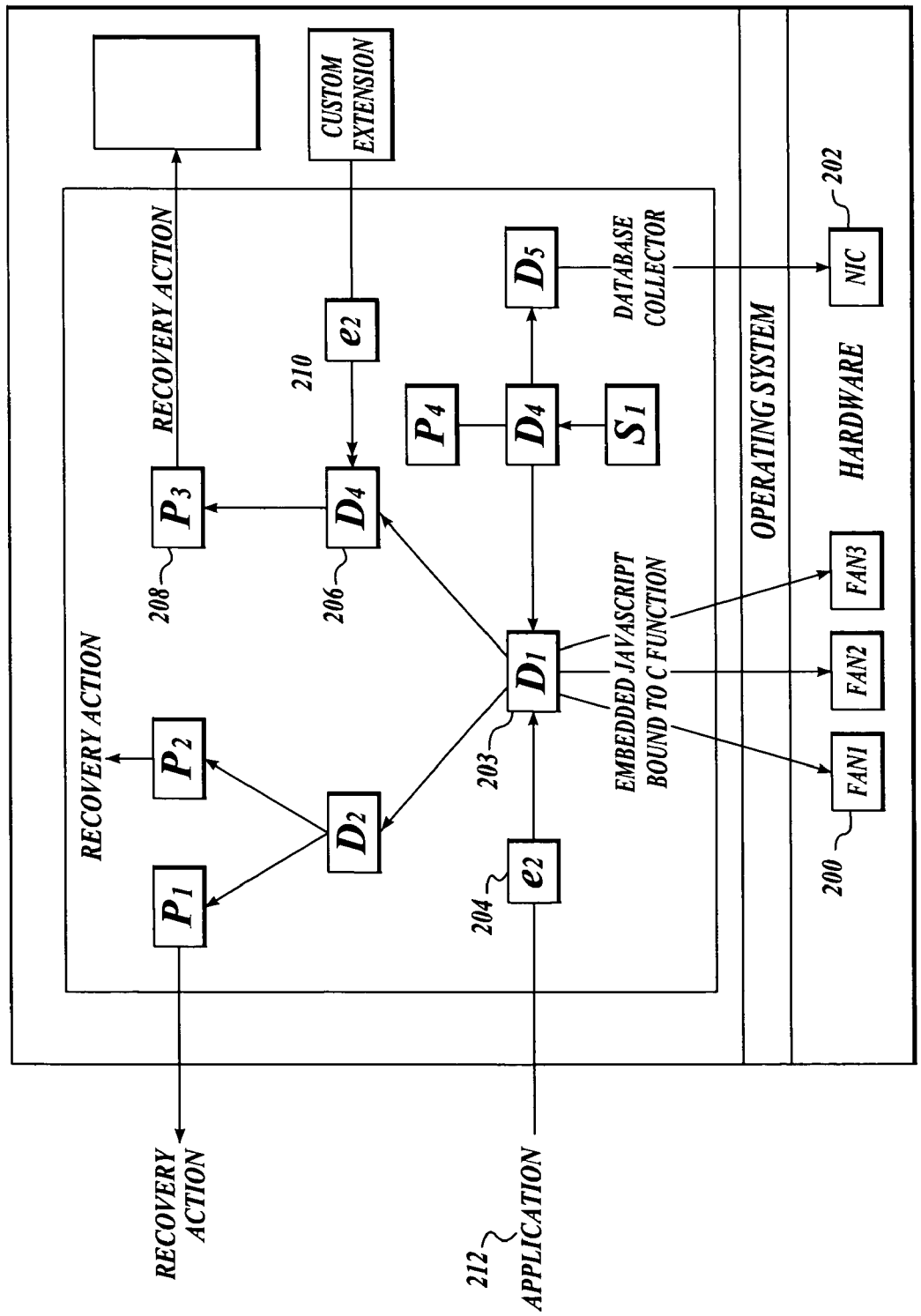
FIG. 2 shows an example of fault monitoring system hardware.

Detectors gather data from various sources including collector databases, events, and applications and even from other detectors. Based on this information decisions are made about the condition of the system and how the system parameters compare to the predetermined parameters that judge whether the system is running optimally or not. If a detector decides that the information it has obtained represents a problem condition then the detector fires (sends a message) and passes that information to a policy or another detector. Note that the detector doesn't decide what action needs to be taken to correct the situation it just passes the condition to one or more policies for analysis and decision making. Detectors can be activated asynchronously by responding to fault management events originated from the system hardware, application software, or the operating system software. The detectors may also be executed in a synchronous or polled manner according to a predetermined schedule. Detectors can also run other detectors through an embedded JavaScript API and detectors may be triggered by other detectors if the first detectors are configured to listen to other detector types. FIG. 1 shows a hierarchy of the detector and policy objects. A process 102, a memory load 104, the network traffic 106, and the time of day 108 data is collected and made available to the appropriate detectors 110. Note that detector 110 can trigger another detector 111. The detectors in turn trigger the appropriate policies 112. Note that some policies 113 can respond to more than one detector. The policies can, in turn, trigger various recovery actions such as paging 114, sending an email 116, rebooting the system 120, restarting the system 122, switching over resources 124, engaging a SNMP trap 126, or some other custom action 128. To prevent a recursive event the detectors are locked out from listening to themselves. When a detector is run, it invokes its rule to determine the status of the information it watches. This rule is implemented in embedded JavaScript and contained in an XML file. When a value watched by a detector violates the rule the detector triggers one or more policies. When a detector triggers, its output can be set to a "fuzzy" value ranging from zero to a hundred as determined by the rule. The detector can also pass other information to a listening detector or policy to help analyze the information. FIG. 2 shows an interface between a systems hardware, detectors, events and policies. A typical piece of hardware can be a fan 200 or a network interface card (NIC) 202. The detectors 203 can monitor the performance of the hardware devices through the operating system (for example, using heartbeats). A hardware anomaly is flagged by detector 203 that can be set to trigger another detector 206, which in turn triggers a policy 208. Note that it is possible to trigger detector 206 only if there is also an event occurrence triggered by an outside condition 210. An application 212 can also provide input into a detector 203 that either combines data from elsewhere to cause the detector 203 to trigger, or on the other hand prevent the detector 203 from triggering by the event's presence.

Policies decide what action to take, based on information provided by detectors. Policies can be configured to listen to a set of detectors as specified by the detector type. If a policy listening to a detector sees the detector fire (that is, have an output value greater than zero) then the policy rule runs. Policies can react to multiple detectors and invoke multiple actions. Policies use the output and any passed information of the relevant detectors to determine the recovery and/or notification action to take. For example, if a fault is detected on a Monday afternoon during business hours, the policy may page a technician in real time, if the fault is detected after hours then the policy may send an email to the technician. Table 2 below shows the attributes of the policy component of the fault management system.

TABLE 2

Policy

| Column Name | Description |
|---|---|
| name | Name that identifies the detector. Must be globally unique among all detectors defined. |
| description | Description of what actions the policy takes given the detector types that it is triggered by. |
| types | Space-delimited list of the types of detectors that cause this policy to fire. The policy rule will run if a detector of a type listed here fires. |
| enable | Boolean value that indicates whether the rule for this policy should run. If 0, the rule will not be run. |
| rule | Embedded JavaScript rule that is run when the policy is triggered. The rule has access to all global variables and functions defined for use within the policy namespace. |

When a policy responds to a fault occurrence it may call a recovery action. Recoveries can be either a corrective action or a notification. Recovery functions are usually implemented using the C programming language and they are called by the embedded JavaScript rules in the policies. Actions can include failovers to standby components. Although detectors and policies both run embedded JavaScript rules in response to certain conditions, they serve different functions. The primary function of detectors is to detect certain conditions, evaluate the output of other detectors, and, if necessary, fire to signal that a specific condition or sets of conditions have been found. Detector rules should be relatively short and fast. Networks of detectors help produce a more accurate and complete diagnosis by evaluating the results of multiple inputs. A policy rule on the other hand needs to take action given that a certain condition was detected. A policy is invoked when a detector of a specified type fires. This allows one policy to respond to several different detectors in the same way. A policy rule simply allows configuration of what actions will be taken in response to various conditions or faults detected. The detectors, the policies, and the schedules are defined in XML database tables.

This embodiment of a multimode fault management system allows a certain degree of multithreading. Each individual detector and policy that is running is locked. This prevents another thread from running the same event or policy simultaneously. However the other detectors remain unlocked and can be run at the same time the first detectors and policy is running. If one detector triggers or sends an event to another that is momentarily locked by another thread, the first thread will wait until it can acquire the lock. Each detector and policy has a local scope that is populated when data is passed from one to another. During this data transfer both objects are locked. After the transfer is complete the object that fired is unlocked.

Scheduled Detector

In the following example, an XML detector description defines a scheduled detector that monitors memory use through a database collector. If the amount of memory used exceeds a certain threshold, the policy triggers and calls a logging action. See additional comments in the XML file below for more information.

```
<TBL name="detector">
<!--
```

Low Memory Detector

This detector collects the base memory table, causing the table to be updated with current values relating to memory usage.

If more than ninety percent of the available memory is used, the detector will publish the name of the resource that is low to any listening policies and fire with a value equal to that of the percentage of used memory.

```
-->
<ROW>
    <COL name="name">lowMemory</COL>
    <COL name="description">Low Memory</COL>
    <COL name="type">lowResource</COL>
    <COL name="url">/fm/memorySmartExplanation.htm</COL>
    <COL name="enable">1</COL>
    <COL name="public">1</COL>
    <COL name="events"></COL>
    <COL name="rule"><SCRIPT>
        var total, free, usage;
        var memthresh = 90;
        dbCollectTable("base", "baseMem");
        total = dbRead("base", "baseMem", "physical", "0") / 1000;
        free = dbRead("base", "baseMem", "physFree", "0") / 1000;
        usage = ((total - free) * 100) / total;
        if (usage >= memthresh) {
            var resource = "Memory";
            publish("resource");
            setOutput(usage);
        }
    </SCRIPT></COL>
</ROW>
</TBL>
<TBL name="policy">
<!--
```

Low Resource Policy

This policy listens to detectors of type "lowResource". Any number of detectors can detect low resources for various system components, and this policy will handle all of them.

This policy assumes that the output of the detectors is the amount of resource utilization. It also assumes that a variable named "resource" will be published to determine which resource is low.

Using this information, errors are written to the error log according to how severe the resource situation is.

```
-->
<ROW>
    <COL name="name">lowResourcePolicy</COL>
    <COL name="description">Low Resource</COL>
    <COL name="url"></COL>
    <COL name="enable">1</COL>
    <COL name="public">1</COL>
    <COL name="types">lowResource</COL>
    <COL name="rule"><SCRIPT>
        var pct = getOutput( );
        if (pct > 95) {
            logError("Very low " + resource + " (" + pct + "%)");
        } else {
```

-continued

```
        logError("Low " + resource + " (" + pct + "%)");
      }
    </SCRIPT></COL>
  </ROW>
</TBL>
<!--
```

Resource Check Schedule

This schedule runs every five seconds, causing the low-Memory detector to run and fire the policy if the memory usage is high.

Additional resource detectors can be added to this schedule set to allow more resources to be monitored.

```
  -->
  <TBL name="schedule">
    <ROW>
      <COL name="name">resourceCheck</COL>
      <COL name="description">Check system resources</COL>
      <COL name="enable">1</COL>
      <COL name="period">5000</COL>
      <COL name="schedule"></COL>
      <COL name="set">lowMemory</COL>
    </ROW>
  </TBL>
</DB>
</GOAHEAD>
```

Networks of detectors are useful in diagnosing intermittent problems that may not be directly testable because of interface limitations or the intermittence of the problem. In these cases, it is useful to correlate faults that have occurred in other related components, and make a diagnosis based on those faults.

Figure 3:
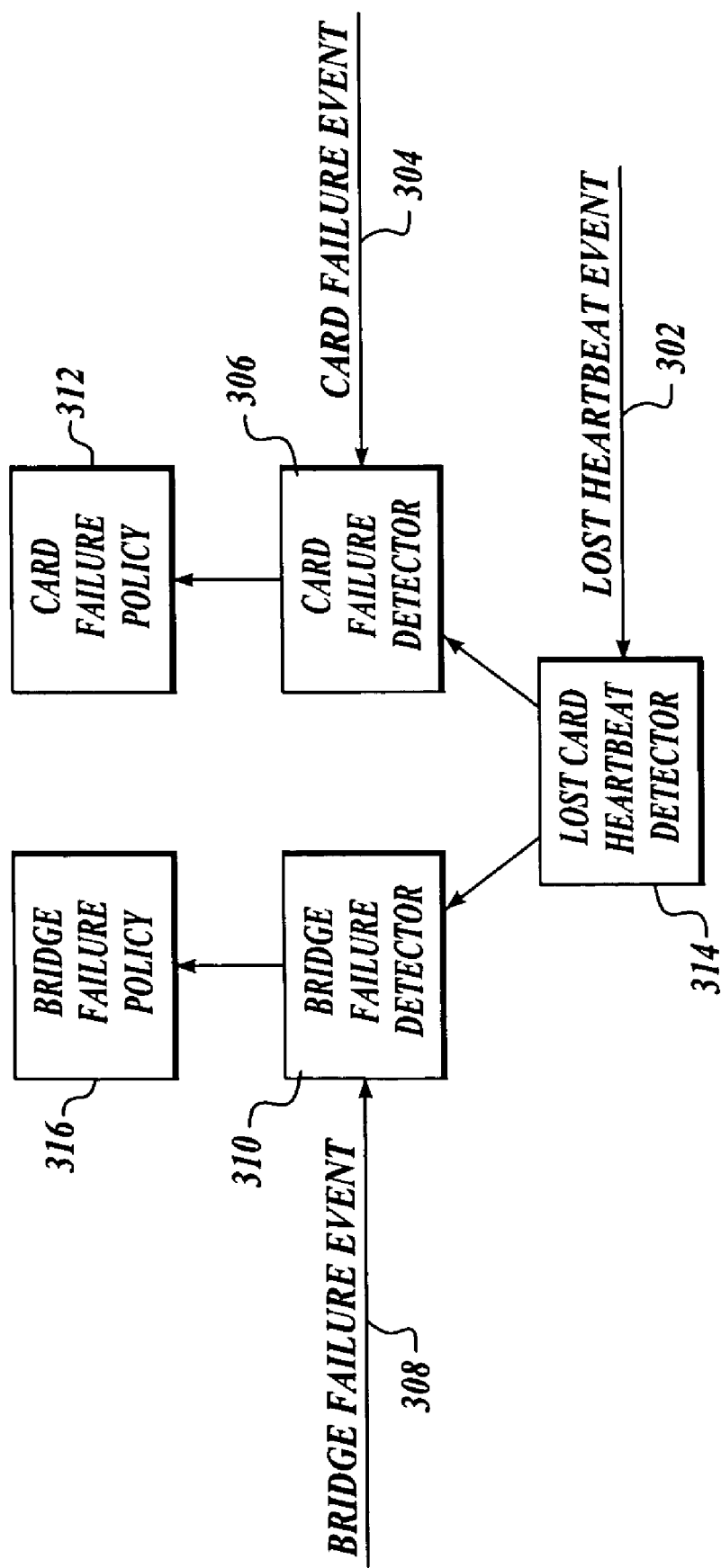
FIG. 3 shows how fault monitoring helps in system diagnostics.

FIG. 3 illustrates a scenario that assumes a hardware platform with five PCI slots and a PCI bridge chip. Assume the bridge chip is not be able to notify the system of its failure. One symptom of the bridge chip failure is that the five cards bridged by the chip become unable to communicate with the host processor. The loss of a hardware heartbeat is detectable by the fault management process. An individual card can also stop responding to heartbeats because of electrical or physical disconnection, or other hardware and software faults. By determining the correct cause of a failure, the system is better equipped to ensure rapid failover between the correct components.

A lost heartbeat event from a card will cause the lost card heartbeat detector 314 to run. This detector populates a table that stores the name of the card that missed a heartbeat, the current time, and the number of times the heartbeat has failed. This information is important because it allows the second level detectors to provide fault correlation. This detector 314 always fires.

Both the bridge 310 detector and the card failure detector 306 listen to the lost heartbeat detector 314. The detectors will run serially, in the order defined in the XML file, but in general, the rules for each are designed so that the order in which they run does not matter. For this example, we assume the bridge failure detector 310 runs first.

If the bridge supports diagnostics, they can be called from the bridge failure detector 310. The results of the tests can be used to determine that the bridge has failed, and fire the detector immediately. The bridge detector, by firing, invokes the bridge failure policy 316 to run. If the problem is intermittent, or the diagnostics cannot detect certain conditions, event correlation must be done by the bridge failure detector 310. The bridge failure detector 310 looks at the card database table to determine if all of the cards have had heartbeat failures within a given period of time. If they have, the bridge is assumed to be bad, and the bridge failure detector 310 fires.

The card failure detector 306 engages in a similar process. The card failure detector can invoke the card failure policy 312. If card diagnostics can show the card has failed, the detector can run those diagnostics to determine whether to fire based on that condition. Because the diagnostics may not run correctly in the case of a bridge failure or other intermittent problem, the correlation table once again comes into play. If the card that lost a heartbeat has repeatedly lost heartbeats recently, and at least one card in the correlation table has not lost any heartbeats, the bridge chip has not failed, but the card has.

The bridge failure event and the card failure event show two additional methods by which a failure in these components can be detected. If driver code (the interface software between the operating system and the device) can internally detect a card or bridge failure, the event can be sent directly. In this case, if either second level detector was triggered through an external event, no additional diagnosis or correlation would be required, and the detector would fire. Detectors can determine whether or not an event caused them to fire by looking at the local "_EVENT" embedded JavaScript variable.

The abovementioned description of a method for fault managing in a multinode networked computing environment according to the preferred embodiments of the present invention is merely exemplary in nature and is no way intended to limit the invention or its application or uses. Further, in the abovementioned description, numerous specific details are set forth to provide a more thorough understanding of the present invention. It will be apparent, however, to one skilled in the art, that the present invention may be practiced without these specific details. In other instances, characteristics and functions of the well-known processes have not been described so as to not obscure the present invention.

We claim:

1. A system to determine a cause of failure in a peripheral bus, said peripheral bus holding multiple PC cards, and where said peripheral bus is connected by a bridge chip to a processor bus, comprising:
    a) a lost heartbeat detector detecting lost heartbeats from each of the multiple PC cards held by the peripheral bus;
    b) said lost heartbeat detector sending a signal to a PC card failure detector when said PC card heartbeat is lost;
    c) said lost heartbeat detector sending a signal to the bridge chip failure detector when said PC card heartbeat is lost; and
    d) said lost heartbeat detector generating a data table registering said lost heartbeats.

2. The system of claim 1 wherein the data table registering lost heartbeats comprises a record of the PC card name, a time a heartbeat failure occurred and a total number of heartbeats lost.

3. The system of claim 2 wherein the bridge failure detector uses the data table to determine if all the PC card heartbeats have been lost thereby indicating a bridge chip failure.

4. The system of claim 2 wherein the bridge failure detector uses the data table to determine if at least one of the multiple PC cards has not had a failed heartbeat thereby indicating no failure of the bridge chip.

* * * * *